United States Patent Office 3,521,612
Patented July 28, 1970

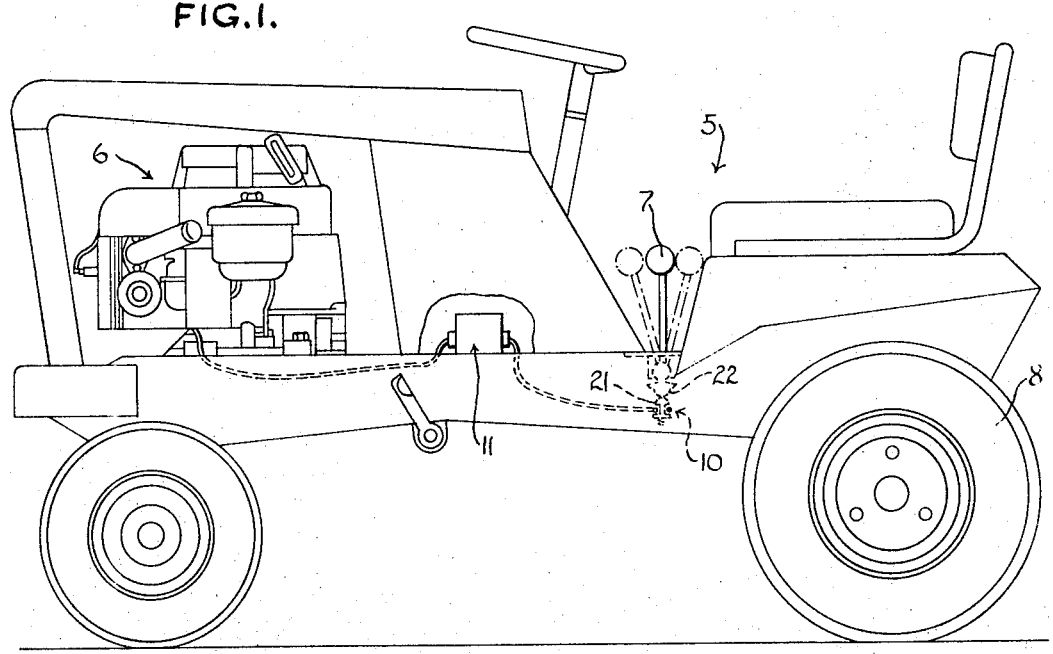
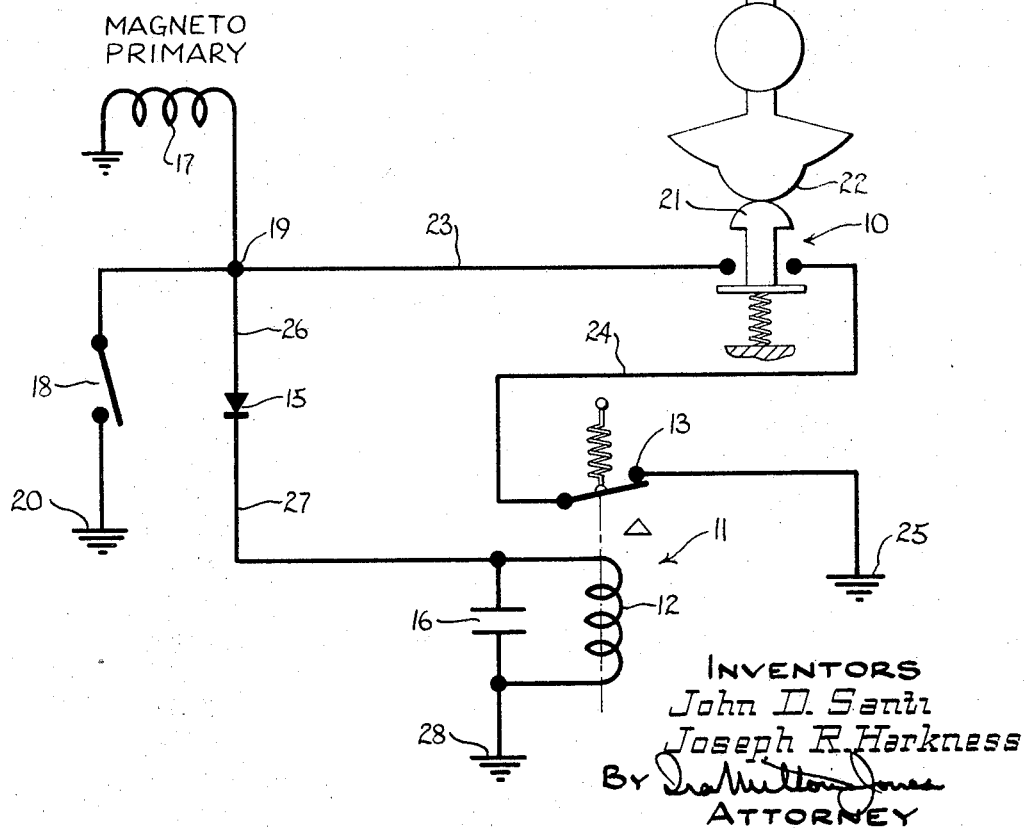

3,521,612
SAFETY INTERLOCK FOR MACHINE POWERED BY MAGNETO IGNITION ENGINE
John D. Santi, West Allis, and Joseph R. Harkness, Germantown, Wis., assignors to Briggs & Stratton Corporation, Wauwatosa, Wis., a corporation of Delaware
Filed Feb. 17, 1969, Ser. No. 799,814
Int. Cl. F02n 11/08, 11/10
U.S. Cl. 123—179
4 Claims

ABSTRACT OF THE DISCLOSURE

In a machine having a manually shiftable control that should be in neutral for safe engine starting, a switch is so associated with the control as to be open only in neutral and is connected in a magneto grounding circuit in series with normally closed contacts of a relay. When the engine runs, the relay winding is energized with unused current pulses from the magneto primary, delivered through a rectifier-capacitor circuit.

---

This invention relates generally to small internal combustion engines having magneto ignition systems, and it pertains more specifically to means for preventing the starting of such an engine when a manually actuatable control on a machine powered by the engine is in such a condition that starting the engine might be dangerous.

Small engines of the type with which this invention is concerned are used for powering a large variety of self-propelled implements such as lawn mowers, garden tractors, snow blowers, tillers and the like. Usually such a machine has a manually operable control by which the engine can be coupled to and uncoupled from the propulsion drive mechanism, and when the engine is being started that control is intended to be set in its position to uncouple the engine lest the machine begin to move without guidance. But because that control is manually operated, it can be in the wrong position when the engine is started, with potentially dangerous consequences.

For example, a riding garden tractor, which may weigh several hundred pounds, usually has a gear shift lever that should be in its neutral position during engine starting and which is located in front of the driver's seat and some distance behind the engine. When such a tractor is powered by an engine having a rewind rope starter, the operator's position for engine starting is at one side of the tractor, near the front of it, where the gear shift lever is not readily accessible to him. If he starts the engine with the gear shift lever in one of its driving positions, the tractor will immediately begin to move, and he may not be able to regain control of it until it has done a great amount of damage, possibly including the infliction of personal injuries upon the operator or others.

Even when the engine of such a machine has an electric starter that is controllable from the normal driving or operating position, it is obviously desirable that there be no possibility of starting the engine at times when the transmission is engaged.

With the foregoing considerations in mind, it is a general object of this invention to provide safety apparatus for preventing the starting of an internal combustion engine having a magneto ignition system at times when a manually operable control on a machine powered by the engine is in such a positon that engine starting might be dangerous.

Any such safety device must meet certain criteria which are virtual imperatives.

Perhaps the most important of these is that the device have an all but infallible dependability. It must be immune not only to mechanical failure but also to interference from the operator, for a safety device that fails or that can be rendered ineffective is more dangerous than none at all, inasmuch as the operator tends to rely on the safety device to compensate for his own lack of attention to safe operating procedures.

Mechanical dependability requires that such a safety device be capable of withstanding extremes of heat, cold, dust, moisture and vibration; that it operate satisfactorily with a minimum of lubrication and maintenance (preferably none); and, generally, that it survive a long life of abuse. Nevertheless, such a device cannot fulfill its purpose unless the customers is willing to buy it, and therefore it must be very low in cost, must not detract from the appearance of the engine or the machine powered by it, and must not inconvenience the operator in the normal and proper use of the equipment.

In view of the foregoing observations, it is another object of this invention to provide a reliable, compact, simple and inexpensive safety interlock for a machine of the character described that will prevent starting of an engine by which the machine is powered unless a manually shiftable control on the machine is in such a position that starting of the engine can be effected safely, which safety interlock is readily adaptable to existing installations without requiring any material modification of the machine or its engine, and does not affect normal performance or operation of the engine in any manner.

Another and very important object of this invention is to provide a safety device of the character described that can be used with a magneto ignition engine having any type of starter, and which utilizes otherwise unused current impulses generated in the primary winding of the magneto, and can even eliminate undesired maverick sparks.

With these observations and objects in mind, the manner in which the invention achieves its purpose will be appreciated from the following description and the accompanying drawing. This disclosure is intended merely to exemplify the invention. The invention is not limited to the particular structure or method disclosed, and changes can be made therein which lie within the scope of the appended claims without departing from the invention.

The drawings illustrate one complete example of the physical embodiment of the invention constructed according to the best mode so far devised for the practical application of the principles thereof, and in which:

FIG. 1 is a view in side elevation, with a portion cut away, of a small tractor powered by a gasoline engine and equipped with the safety device of this invention; and FIG. 2 is a diagrammatic view of the safety device.

Referring now to the accompanying drawings, the numeral 5 designates generally a self-propelled machine which incorporates the safety device of this invention and which is illustrated as a small riding tractor, powered by a single-cylinder gasoline engine 6 that has a magneto ignition system.

Any such self-propelled machine incorporates some type of manually shiftable control by means of which the engine can be coupled to and uncoupled from the traction means of the machine, and in this case such manual control is illustrated as comprising a gear shift lever 7 that has a neutral position in which the rear traction wheels 8 of the tractor are uncoupled from the engine. The gear shift lever can be moved both forwardly and rearwardly from its neutral position to various gear change positions in which the engine is drivingly connected with the wheels 8.

The safety device of this invention comprises, in general, a switch 10 that is operatively associated with the gear shift lever 7, a relay 11 having a winding 12 and normally closed contacts 13, a small rectifier 15, a capacitor 16, and conductors (described hereinafter) that provide two circuits, one an energizing circuit for the relay winding 12, and the other a magneto grounding circuit in which the switch 10 is connected in series with the contacts 13 of the relay.

The safety device cooperates with the engine magneto in such a manner as to cause the magneto primary 17 to be grounded (i.e., short circuited), to prevent engine ignition, whenever the engine is not running and the gear shift lever is out of its neutral position; but when the engine is running, the relay winding 12 is energized from the magneto primary and the grounding circuit is thereby maintained open so that the engine can continue to run regardless of the position of the shift lever.

The machine 5 is illustrated as having a momentary contact normally-open engine stop switch 18 which can be actuated for stopping the engine. One terminal of the stop switch 18 is connected with the "hot" side of the magneto primary, as at 19, and its other terminal is grounded, as at 20, so that in its normally open position the stop switch leaves the magneto system in a condition to allow the engine to run, but when closed it short circuits the magneto primary and prevents ignition.

The circuit of the safety device of this invention that comprises the switch 10 and the normally-closed contacts 13 of the relay 11 is connected in parallel with the stop switch 18 to provide a second magneto grounding circuit.

The switch 10 is so associated with the gear shift lever 7 as to be open when the shift lever is in its neutral position and to be closed whenever the shift lever is out of its neutral position. Since the neutral position of the shift lever is substantially at the center of its range of motion, the switch 10 can be in the nature of a push button switch and its push button actuator 21 can be cooperable with a cam 22 that is mounted on the shift lever itself or on a part connected with the shift lever to move in unison therewith.

The circuit of the safety device comprises a conductor 23 that is connected between the "hot" terminal of the magneto primary and the switch 10, and a conductor 24 that is connected between the switch 10 and one of the normally-closed contacts 13 of the relay 11. The other relay contact is of course grounded as at 25.

After the engine begins to run, the winding 12 of the relay 11 is energized from the magneto primary 17 through a circuit comprising a conductor 26 connected between the "hot" side of the primary and the rectifier 15 and another conductor 27 connected between the rectifier and one end of the relay winding. The other end of the relay winding is of course grounded, as at 28, to complete the energizing circuit. With the winding 12 of the relay energized, its contacts 13 are of course held open, and hence the grounding circuit through said contacts and the switch 10 remains open even though the gear shift lever is moved out of neutral to permit the switch 10 to close.

The connection of the relay winding 12 with the primary of the magneto does not interfere with normal engine ignition because the rectifier 15 passes to the relay winding only current of the polarity opposite to that used for ignition.

Specifically, in the operation of an engine having a magneto ignition system that comprises a flywheel-carried orbitally moving permanent magnet (as is conventional in most single cylinder engines), a pulse of voltage of one polarity is induced in the magneto primary before the breaker points close. Closing and opening of the breaker points occurs during a subsequent pulse of the opposite polarity. It is inherent in the operation of the magneto that the first pulse must be produced; but that first pulse is not utilized for actual ignition, and with some magnetos, under certain conditions, it in fact causes an undesired maverick spark, as explained in Pat. No. 3,114,851, to J. D. Santi, at col. 4, line 51 et seq. With the safety device of this invention, the energy that might be employed for producing maverick sparks in such cases is diverted to maintaining energization of the relay winding 12.

Since the current that energizes the relay winding 12 is produced in pulses, the condenser 16 is connected across the relay winding to maintain a substantially steady D.C. through it while the engine is running.

From the foregoing description taken with the accompanying drawing it will be apparent that this invention provides a compact, inexpensive and reliable safety interlock by which an internal combustion engine is prevented from starting unless a manually shiftable control on a machine on which the engine is installed is in a position such that the engine is uncoupled from the machine to provide safe starting conditions.

What is claimed is:

1. In combination with an internal combustion engine having a magneto with a primary winding that can be grounded to prevent ignition, and a machine having a transmission to which the engine is coupled and which is manually shiftable to and from a neutral non-driving condition, means for preventing starting of the engine when the transmission is out of its neutral condition, said means comprising:
   (A) a switch operatively associated with the transmission to be open when the transmission is in its neutral condition and to be otherwise closed;
   (B) a relay having normally closed contacts and a coil which is energizable to effect opening of the contacts;
   (C) means defining a magneto grounding circuit in which said switch and the contacts of the relay are connected in series; and
   (D) means connected with the primary winding to provide a circuit by which the relay coil is energized from the primary winding of the magneto, said last named means comprising
      (1) rectifier means connected in series circuit with the primary winding and the relay coil and arranged to pass current of the polarity opposite to that used for ignition, and
      (2) a capacitor shunted across the relay coil.

2. In combination with an internal combustion engine having magneto ignition apparatus with a primary winding that can be grounded to prevent ignition, and a machine having a transmission to which the engine is coupled and which is manually shiftable to and from a neutral non-driving condition, means for preventing starting of the engine when the transmission is out of its neutral condition, said means comprising:
   (A) first switch means operatively associated with the transmission to be open when the transmission is in its neutral condition and to be otherwise closed;
   (B) an electromagnetic actuator;
   (C) means connected with the primary winding and with the electromagnetic actuator and providing a circuit through which the electromagnetic actuator is energized with current induced in the primary at times when the engine is running;
   (D) normally closed switch means operatively associated with the electromagnetic actuator and arranged to be opened in consequence of energization of the electromagnetic actuator; and
   (E) conductor means defining a grounding circuit for the magneto primary in which said first switch means and said normally closed switch means are connected in series.

3. The combination of claim 2, further characterized by:
   said means connected with the primary winding and with the electromagnetic actuator comprising
      (1) a rectifier which passes current of polarity opposite to that used for ignition, connected in series with the primary winding and the electromagnetic actuator, and
      (2) a capacitor shunted across the electromagnetic actuator.

4. In a machine powered by an internal combustion engine having a magneto ignition system with a primary winding that can be short-circuited to prevent ignition, and which machine has a control that is manually shiftable to and from a defined position in which, for safety, the control should be maintained during engine starting, means for preventing starting of the engine when said control is out of said position, said last named means comprising:

(A) switch means operatively associated with said control and arranged to be open when the control is in said defined position and to be closed when the control is out of said position;

(B) a relay having
   (1) a winding, and
   (2) contacts that are normally closed but are opened in consequence of energization of the relay winding;

(C) means defining a short-circuiting circuit for the magneto primary winding in which the switch means and the contacts of the relay are connected in series, and (D) means for energizing the relay winding with current pulses from the magneto primary that are not utilized for ignition, said last named means comprising
   (1) a rectifier connected in a series circuit with the magneto primary and the relay winding, and
   (2) a capacitor connected across the relay winding.

References Cited

UNITED STATES PATENTS

| | | | |
|---|---|---|---|
| 2,511,054 | 6/1950 | Ferguson et al. | 123—179 |
| 2,685,650 | 8/1954 | Collins et al. | 123—179 |
| 3,151,249 | 9/1964 | Ives | 123—179 |

MARK M. NEWMAN, Primary Examiner

R. COX, Assistant Examiner

U.S. Cl. X.R.

74—843, 850; 123—146.5, 198